(12) United States Patent
Speggiorin

(10) Patent No.: US 7,229,053 B2
(45) Date of Patent: Jun. 12, 2007

(54) TRIPOD FOR SUPPORTING APPARATUS IN GENERAL AND, IN PARTICULAR, FOR OPTICAL OR PHOTOGRAPHIC APPARATUS AND THE LIKE

(75) Inventor: Paolo Speggiorin, Mussolente (IT)

(73) Assignee: Lino Manfrotto + Co. S.p.A., Bassano Del Grappa (IT)

( * ) Notice: Subject to any disclaimer, the term of this patent is extended or adjusted under 35 U.S.C. 154(b) by 40 days.

(21) Appl. No.: 10/523,161

(22) PCT Filed: Jul. 30, 2002

(86) PCT No.: PCT/IT02/00503

§ 371 (c)(1),
(2), (4) Date: Sep. 23, 2005

(87) PCT Pub. No.: WO2004/011843

PCT Pub. Date: Feb. 5, 2004

(65) Prior Publication Data

US 2006/0138289 A1    Jun. 29, 2006

(51) Int. Cl.
*F16M 11/38* (2006.01)
(52) U.S. Cl. .............................. 248/163.1; 248/181.2; 248/187.1
(58) Field of Classification Search ............. 248/163.1, 248/163.2, 166, 168, 177.1, 181.2, 187
See application file for complete search history.

(56) References Cited

U.S. PATENT DOCUMENTS

| | | | |
|---|---|---|---|
| 2,940,708 A | 6/1960 | Grimal | |
| 4,085,915 A * | 4/1978 | Song et al. | 248/187.1 |
| 5,341,185 A | 8/1994 | Koichiro | |
| 5,390,885 A | 2/1995 | Shen | |
| 2003/0102414 A1* | 6/2003 | Smart | 248/170 |

FOREIGN PATENT DOCUMENTS

| | | | |
|---|---|---|---|
| CH | 366 676 | 1/1963 | |
| DE | 837 610 | 4/1952 | |
| DE | 3805260 A1 * | 8/1989 | 248/163.1 |
| EP | 1 122 486 | 8/2001 | |
| FR | 509 657 | 11/1920 | |
| FR | 756 476 | 12/1933 | |
| FR | 923 478 | 7/1947 | |
| FR | 1 064 065 | 5/1954 | |
| GB | 2203637 A * | 10/1988 | 248/163.1 |
| WO | WO 2005/068895 A1 * | 1/2005 | |

* cited by examiner

*Primary Examiner*—Ramon O Ramirez
(74) *Attorney, Agent, or Firm*—Stradley Ronon Stevens & Young, LLP

(57) ABSTRACT

A tripod for supporting apparatus in general and, in particular, for optical or photographic apparatus and the like. The tripod has a spider, a pillar arranged to be housed with a stem of the pillar in a through-hole formed through the spider, and a head arranged for receiving the apparatus and connected to a first end of the pillar. In the closed-up or fully retracted condition, that is, in the most compact condition of the tripod, the head is at least partially housed inside the through-hole.

21 Claims, 3 Drawing Sheets

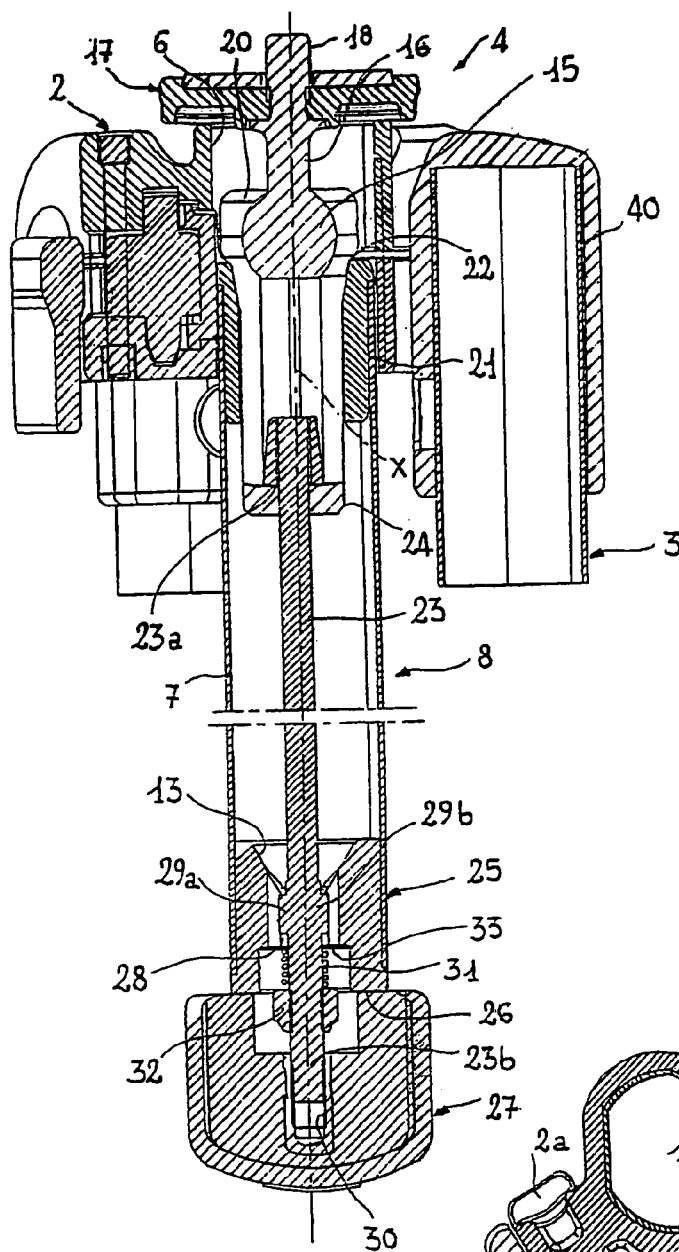
Fig. 3
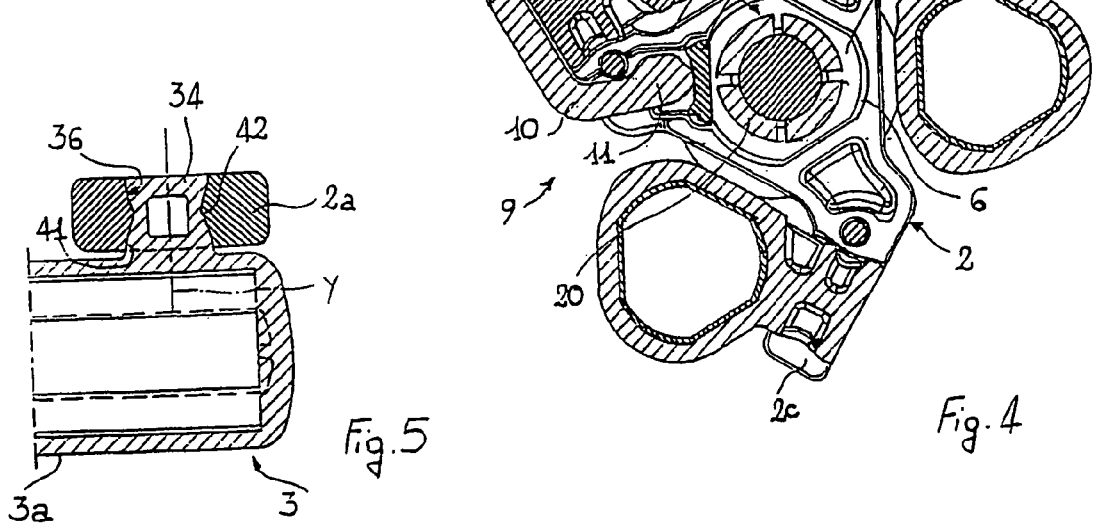
Fig. 5
Fig. 4

TRIPOD FOR SUPPORTING APPARATUS IN GENERAL AND, IN PARTICULAR, FOR OPTICAL OR PHOTOGRAPHIC APPARATUS AND THE LIKE

TECHNICAL FIELD

The present invention relates to a tripod for supporting apparatus in general and, in particular, for optical or photographic apparatus and the like.

In this context, the term "tripod" is used in its widest sense to mean a support with three or more legs converging in a spider for the positioning and mounting of a head with which the desired apparatus can in turn be associated.

TECHNOLOGICAL BACKGROUND

Within the specific technical field, it is desirable to provide tripods which can satisfy the conflicting requirements of minimized size when closed up or fully retracted and of maximized positioning height when the tripod is opened out or fully extended. A constructional limitation typical of known tripods results from the fact that each leg of the tripod is articulated to the spider by a pin extending through the first leg section; this obstructs the further sections which are fitted telescopically in the first, affecting their useful length and limiting their extension.

A first known tripod solution which pursues this aim is described in European Patent Application EP 1122486. In order to maximize the positioning height of the fully extended tripod, this solution maximizes the length of each leg section of the tripod by using an articulation of the legs to the spider which is achieved by opposed appendages projecting radially from a cap fitted on the top of the leg section articulated to the spider. This solution affords the advantage of making the best use of the telescopic lengthening of the legs, permitting optimal utilization of the space inside the telescopic extensions.

However, even with this solution, the tripod is still quite bulky in the fully retracted condition.

SUMMARY OF THE INVENTION

The problem addressed by the present invention is that of providing a tripod for supporting apparatus in general and, in particular, for optical or photographic apparatus and the like, which is designed structurally and functionally to overcome the limitations set out above with reference to the prior art cited.

This problem is solved by the present invention by providing an improved tripod for supporting apparatus in general and, in particular, for optical or photographic apparatus and the like. The tripod has a spider, a pillar arranged to be housed slidably with a stem of the pillar in a through-hole formed through the spider, and a head arranged for receiving the apparatus. The head is connected to a first end of the pillar. In the fully retracted condition, that is, in the most compact condition of the tripod, the head is at least partially housed inside the through-hole.

It is to be understood that both the foregoing general description and the following detailed description are exemplary, but are not restrictive, of the invention.

BRIEF DESCRIPTION OF THE DRAWINGS

The characteristics and the advantages of the invention will become clearer from the detailed description of a preferred embodiment thereof, illustrated by way of non-limiting example, with reference to the appended drawings. It is emphasized that, according to common practice, the various features of the drawings are not to scale. On the contrary, the dimensions of the various features are arbitrarily expanded or reduced for clarity. Included in the drawings are the following figures:

FIG. 3 is a sectioned side elevational view of a detail of the tripod of FIG. 2;

FIG. 4 is a view of a second detail of the tripod of FIG. 2, from above and in section; and FIG. 5 is a sectioned side elevational view of a third detail of the tripod of FIG. 2.

DETAILED DESCRIPTION OF THE INVENTION

Figure 1:
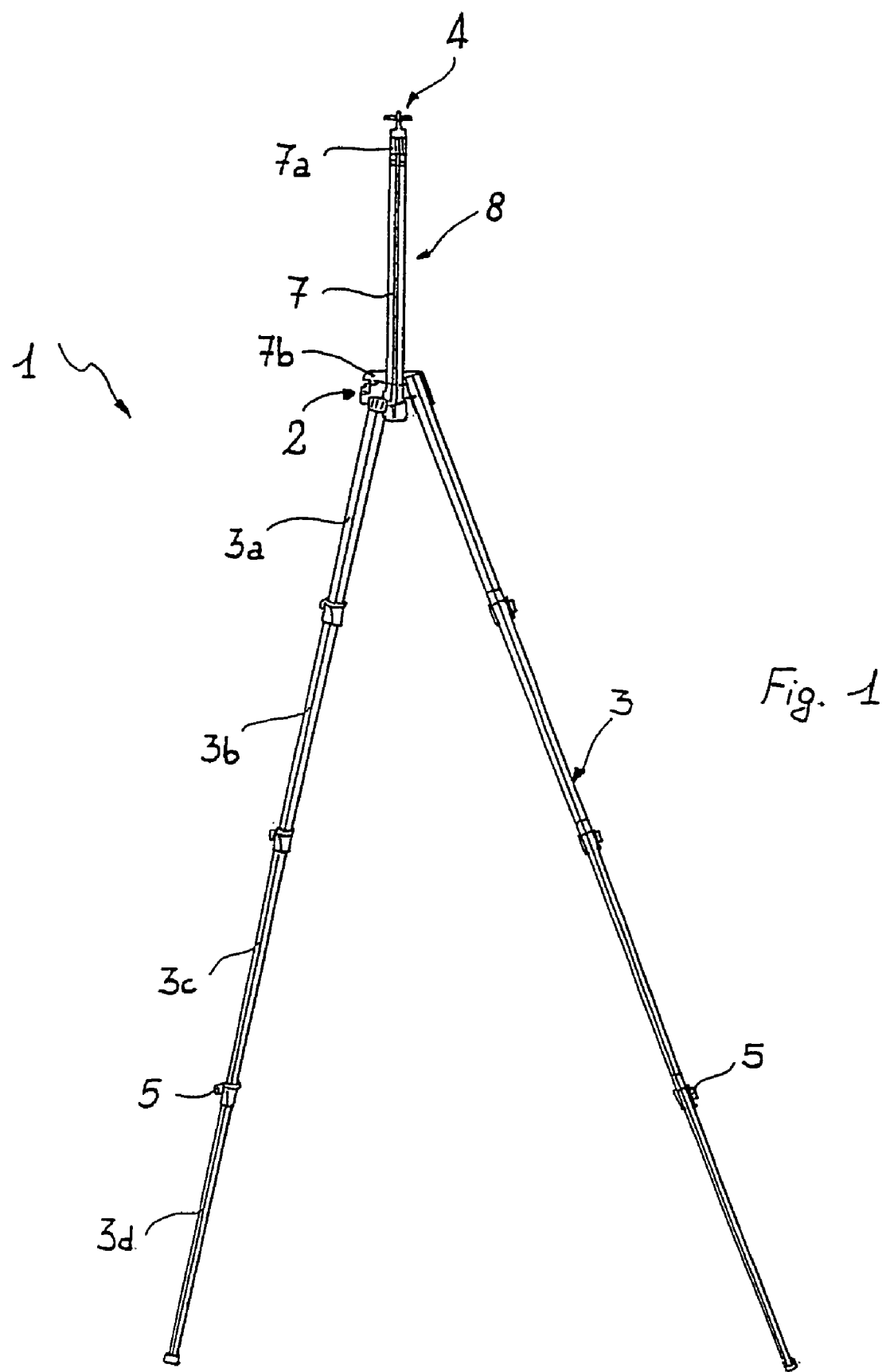
FIG. 1 is a perspective view of a tripod formed in accordance with the present invention, in a first operative condition in which it is extended to the maximum extent.
Figure 2:
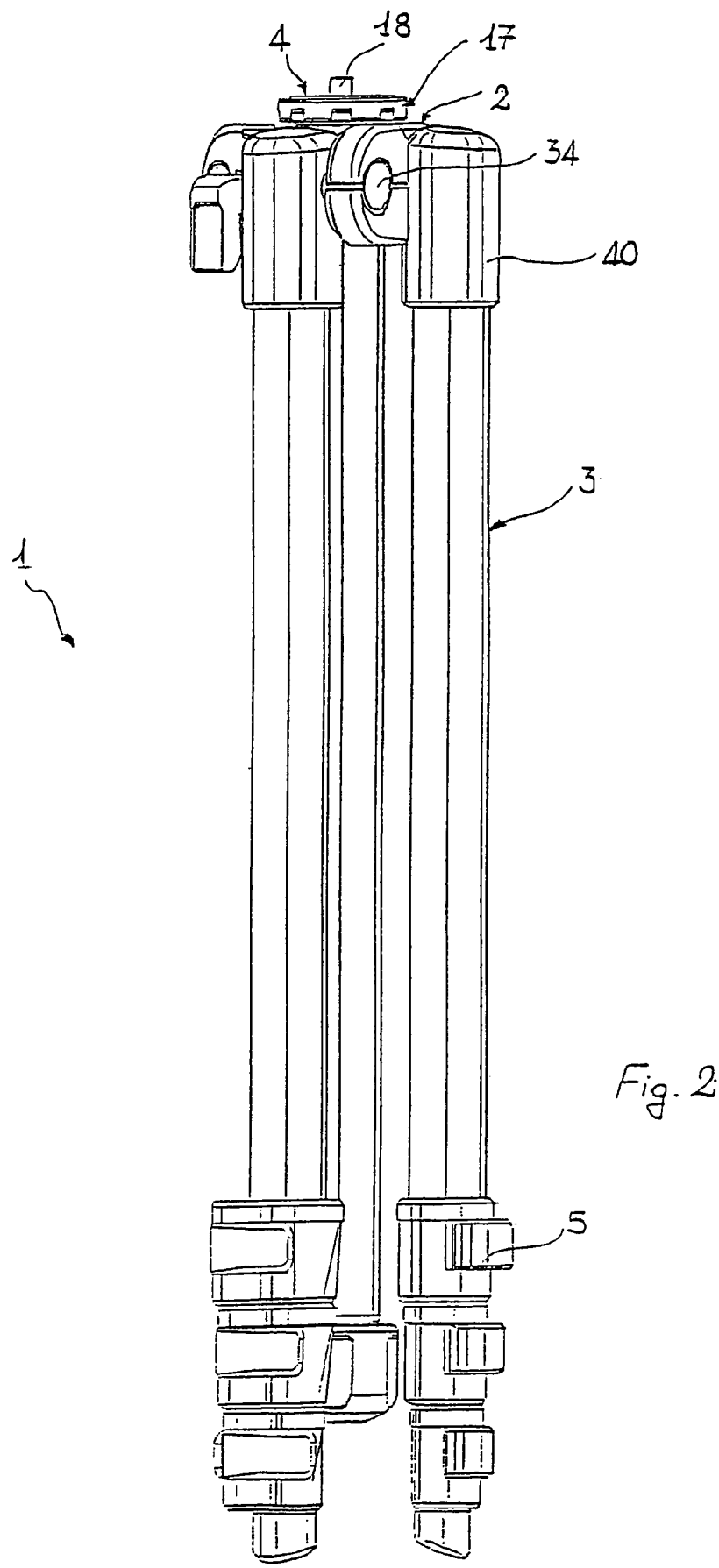
FIG. 2 is a perspective view of the tripod of FIG. 1 in a second, fully retracted, most compact operative condition.

Referring now to the drawings, like reference numbers refer to like elements throughout the various figures that comprise the drawing. In FIGS. 1 and 2, a tripod for supporting apparatus in general and, in particular, for optical or photographic apparatus and the like, formed in accordance with the invention, is generally indicated by reference number 1.

The term "tripod" is intended to define supports for apparatus, preferably cinematographic or photographic apparatus, without limitation of the number of legs.

The tripod 1 includes a spider 2 with a principal axis X, and comprising three lobes 2a, 2b, 2c in which three respective legs, all indicated 3, converge and are articulated in the manner described below. Each leg 3 is formed with a telescopic structure of known type, with four sections 3a, 3b, 3c, 3d, the relative positioning of which is adjustable by clamps, all indicated 5. A sleeve 40 is fitted and fixed like a cap on each first section 3a and bears a radial appendage 34 which can be housed so as to be rotatable about an axis Y but restrained axially in a respective seat 36 formed in the corresponding lobe 2a, 2b, or 2c. For the axial restraint of the appendage 34 in the seat 36, both have a double conical shape defining a channel 41 and an annular cusp 42, respectively, in a mutually coupled condition.

In a central region of the spider 2 there is a through-hole 6 which has a cylindrical surface extending coaxially with the axis X, and in which a stem 7 of a cylindrical, tubular pillar 8 with axially opposed ends indicated 7a and 7b, is housed slidably.

The sliding of the pillar 8 in the through-hole 6 can be locked in an adjustable position by a brake 9, preferably of the type with a cam 11 and a pad 12, operated by an operating lever 10.

The tripod 1 comprises a head 4 with a ball joint and a mechanism for fixing the head 4 to the end 7a of the stem 7. The fixing mechanism comprises a collet 19 with four jaws 20 housed inside a sleeve 21 with a frustoconical opening 7a, driven into the end 7a of the stem 7.

The head 4 comprises a spherical element 15 from which a rod 16 extends, the rod 16 carrying a ring nut 17 on which the preselected apparatus (not shown) is releasably restrained, for example, by a threaded appendage 18. The spherical element 15 is housed in the collet 19 and, according to the degree of tightening of the jaws 20, can or cannot rotate in order to achieve the desired orientation of the apparatus.

A tie rod 23 has an end 23a in abutment with a base 24 of the collet 19.

In order to adjust the orientation of the head 4, a mechanism for adjusting the tension of the tie rod 23 is provided and includes a knob 27 which is engaged by the screwing of a female thread 30 thereof onto a threaded end 23b of the tie rod 23. A guide bush 25 is driven into the end 7b of the stem 7, partially projecting therefrom to define an abutment surface 26 for the knob 27.

An axial hole 13 formed in the guide bush 25 has channels 28 which are engaged by flat portions 29a, 29b of the tie rod 23, which is consequently guided in the hole 13 in a non-rotatable manner.

The tensioning of the tie rod 23 caused by the screwing of the knob 27 exerts on the collet 19 a pull which, because of the frustoconical shape of the opening 22, clamps the jaws 20 of the collet 19 onto the spherical element 15 so that the head 4 is thus locked in the preselected orientation. If the knob 27 is slackened, the head 4 can be freely oriented.

In order for the tie rod 23 to be tensioned slightly, even when the knob 27 is fully slackened (or even removed to permit removal of the stem 7 from the spider 2), a mechanism for preloading the collet system is provided and comprises a spring 31 interposed between a ring 32 fixed to the tie rod 23 and a shoulder 33 formed in the guide bush 25.

When the tripod 1 is in the operative, "opened-out," or fully extended position, it can adopt a configuration of maximum extent in which the legs 3 are in the most extended position and the pillar 8 is slid out of the through-hole 6 in the spider 2 to the maximum extent.

The extension and positioning of the legs 3 in the fully extended position are performed conventionally by operating the clamps 5 and pivoting the legs 3 about the appendages 34.

The preselected apparatus is mounted on the threaded appendage 18 and is oriented by slackening of the knob 27, and consequently of the tie rod 23, so that the collet 19 loosens its grip on the spherical element 15 so that it can adopt different orientations. Even if the knob 27 is accidentally slackened too much, the tie rod 23 nevertheless maintains a minimum tensioning condition by virtue of the spring 31, so that sudden and uncontrolled oscillations of the head 4 and possible damage to the apparatus fixed thereto are prevented.

When the desired position has been reached, the knob 27 is tightened to lock the ball joint in the position reached and the height of the pillar 8 is then adjusted by the operating lever 10, whilst the preselected orientation of the ring nut 17 is maintained.

In order to close the tripod 1, once, the apparatus has been removed from the head 4 and the legs 3 have been closed up by telescopic retraction of the sections 3a, 3b, 3c, and 3d into one another, the knob 27 is slackened, leaving the head 4 free to oscillate. By operation of the operating lever 10, the pillar 8 is translated to a position of minimum extent in which the end 7a of the stem 7 of the pillar 8 is housed in the through-hole 6. At the end of its travel, part of the head 4, in particular, the spherical element 15 and the rod 16, are also housed inside the through-hole 6. The ring nut 17 is brought into abutment with the spider 2, with the function of a stop for preventing loss of the pillar 8, which is restrained by the spider 2, between the ring nut 17 and the knob 27.

The invention thus solves the problem posed, affording many advantages over the prior art mentioned.

A first advantage is that the tripod is extremely compact in the closed-up or fully retracted condition, by virtue of the fact that the head, which usually projects from the spider, can be introduced into the through-hole in the spider.

The fact that the head can be housed in the spider also simplifies the construction of the pillar since an attachment for the head, which also projects from the spider in conventional tripods, is no longer provided.

In addition, even though the tripod has extremely compact dimensions when closed up, its vertical extent when opened out or fully extended is not compromised, since there is no limitation to the extension of the legs or of the pillar.

Moreover, even though the head is housed in the through-hole in the spider, it can nevertheless be operated easily since the controls for the orientation and adjustment of the head are located at the opposite end of the pillar, and are thus easily accessible.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A tripod for supporting apparatus in general and, in particular, for optical or photographic apparatus, comprising:
   a spider having a through-hole formed through the spider;
   a pillar having a stem with first and second ends and being housed slidably with the stem in the through-hole formed through the spider; and
   a head adapted to receive the apparatus, the head being connected to the first end of the stem and being at least partially housed inside the through-hole when the tripod is in its fully retracted and most compact condition.

2. The tripod according to claim 1, further comprising means for adjusting the orientation of the head, the adjustment means being fixed to the second end of the stem, axially remote from the first end.

3. The tripod according to claim 2 in which the head comprises a spherical element and a collet housed inside the stem in the region of the first end, the collet engaging the spherical element in order to clamp it selectively, relative to the stem, and the means for adjusting the orientation of the head comprises a tie rod having first and second ends and being associated, via the first of its ends, with the collet in order, when tensioned, to lock the relative rotation of the spherical element inside the collet.

4. The tripod according to claim 3 in which the means for adjusting the orientation of the head further comprises a knob in abutment with the second end of the stem, the tie rod being disposed inside the stem and being connected, via the second of its ends, to the knob, for the adjustment of the tensioning of the tie rod.

5. The tripod according to claim 4 in which the knob comprises a female thread and in which the second end of the tie rod is threaded and engages the female thread by screwing, so that rotation of the knob varies the tensioning of the tie rod and consequently the clamping of the collet onto the head.

6. The tripod according to claim 4 further comprising axial preloading means provided on the tie rod, so that the tie rod is tensioned, even when the knob is fully slackened, ensuring a minimal clamping of the collet onto the spherical element.

7. The tripod according to claim 6 in which the means for adjusting the orientation of the head further comprises a guide bush driven into the second end of the stem, the tie rod being guided in the guide bush in a non-rotatable manner, and the preloading means comprises a spring interposed between the tie rod and the guide bush.

8. The tripod according to claim 3 in which the means for adjusting the orientation of the head further comprises a guide bush driven into the second end of the stem, the tie rod being guided in the guide bush in a non-rotatable manner.

9. The tripod according to claim 1 in which the head comprises a spherical element and a collet housed inside the stem in the region of the first end, the collet engaging the spherical element in order to clamp it selectively, relative to the stem.

10. The tripod according to claim 3 in which the head further comprises a ring nut mounted on the spherical element and such that, when the tripod is in the fully retracted condition, the ring nut is in abutment with the spider and the spherical element is housed inside the through-hole.

11. The tripod according to claim 9, further comprising a sleeve with a frustoconical opening, driven into the first end of the stem, the collet being housed inside the sleeve and cooperating with the frustoconical opening for the clamping of the spherical element.

12. The tripod according to claim 1, further comprising means for locking the sliding of the pillar, the locking means including a brake acting on the pillar.

13. The tripod according to claim 12 in which the brake comprises an operating lever terminating in a cam-like eccentric element operating on a pad movable radially in a seat formed in the spider in a manner such that the pressure of the pad on the pillar is determined by the position of the operating lever.

14. The tripod according to claim 1 further comprising legs each articulated to the spider by a respective first section, respective appendage projecting radially from an end of the first section, without occupying space inside the section.

15. The tripod according to claim 14 in which the appendage is formed integrally on a sleeve fitted firmly on the first section, each appendage being housed in a respective seat formed in the spider for the articulation of the leg.

16. The tripod according to claim 15 in which the appendage and the seat are provided with respective complementary restraining means for restraining axially the appendage, while allowing the appendage to rotate, in the seat.

17. A tripod for supporting apparatus in general and, in particular, for optical or photographic apparatus, comprising:
a spider having a through-hole formed through the spider;
legs each articulated to the spider by a respective first section, a respective appendage projecting radially from an end of the first section, without occupying space inside the section;
a pillar having a stem with first and second ends and being housed slidably with the stem in the through-hole formed through the spider;
means for locking the sliding of the pillar, the locking means including a brake acting on the pillar;
a head adapted to receive the apparatus, the head being at least partially housed inside the through-hole when the tripod is in its fully retracted and most compact condition and the head having a spherical element and a collet housed inside the stem in the region of the first end, the collet engaging the spherical element in order to clamp it selectively, relative to the stem, so that the head is connected to the first end of the stem; and
means for adjusting the orientation of the head, the adjustment means being fixed to the second end of the stem, axially remote from the first end.

18. The tripod according to claim 17 in which the head further comprises a ring nut mounted on the spherical element and such that, when the tripod is in the fully retracted condition, the ring nut is in abutment with the spider and the spherical element is housed inside the through-hole, the tripod further comprising a sleeve with a frustoconical opening, driven into the first end of the stem, the collet being housed inside the sleeve and cooperating with the frustoconical opening for the clamping of the spherical element.

19. The tripod according to claim 17 in which:
the means for adjusting the orientation of the head comprises (a) a tie rod having first and second ends and being associated, via the first of its ends, with the collet in order, when tensioned, to lock the relative rotation of the spherical element inside the collet, and (b) a knob in abutment with the second end of the stem, the tie rod being disposed inside the stem and being connected, via the second of its ends, to the knob, for the adjustment of the tensioning of the tie rod, the knob having a female thread and the second end of the tie rod being threaded to engage the female thread by screwing, so that rotation of the knob varies the tensioning of the tie rod and consequently the clamping of the collet onto the head, and (c) a guide bush driven into the second end of the stem, the tie rod being guided in the guide bush in a non-rotatable manner; and
the tripod further comprises axial preloading means provided on the tie rod, so that the tie rod is tensioned, even when the knob is fully slackened, ensuring a minimal clamping of the collet onto the spherical element, the preloading means comprising a spring interposed between the tie rod and the guide bush.

20. The tripod according to claim 17 in which the appendage is formed integrally on a sleeve fitted firmly on the first section, each appendage being housed in a respective seat formed in the spider for the articulation of the leg, the appendage and the seat being provided with respective complementary restraining means for restraining axially the appendage, while allowing the appendage to rotate, in the seat.

21. A tripod for supporting apparatus in general and, in particular, for optical or photographic apparatus, comprising:
a spider having a through-hole formed through the spider;
legs each articulated to the spider by a respective first section, a respective appendage projecting radially from an end of the first section, without occupying space inside the section, the appendage formed integrally on a sleeve fitted firmly on the first section, each appendage being housed in a respective seat formed in the spider for the articulation of the leg, the appendage and the seat being provided with respective complementary restraining means for restraining axially the appendage, while allowing the appendage to rotate, in the seat;
a pillar having a stem with first and second ends and being housed slidably with the stem in the through-hole formed through the spider;
means for locking the sliding of the pillar, the locking means including a brake acting on the pillar, the brake having an operating lever terminating in a cam-like eccentric element operating on a pad movable radially in a seat formed in the spider in a manner such that the pressure of the pad on the pillar is determined by the position of the operating lever;

a head adapted to receive the apparatus, the head being at least partially housed inside the through-hole when the tripod is in its fully retracted and most compact condition and the head having (a) a spherical element and a collet housed inside the stem in the region of the first end of the stem, the collet engaging the spherical element in order to clamp it selectively, relative to the stem, so that the head is connected to the first end of the stem, and (b) a ring nut mounted on the spherical element and such that, when the tripod is in the fully retracted condition, the ring nut is in abutment with the spider and the spherical element is housed inside the through-hole;

a sleeve with a frustoconical opening, driven into the first end of the stem, the collet being housed inside the sleeve and cooperating with the frustoconical opening for the clamping of the spherical element;

means for adjusting the orientation of the head, the adjustment means being fixed to the second end of the stem, axially remote from the first end, the adjustment means including (a) a tie rod having first and second ends and being associated, via the first of its ends, with the collet in order, when tensioned, to lock the relative rotation of the spherical element inside the collet, and (b) a knob in abutment with the second end of the stem, the tie rod being disposed inside the stem and being connected, via the second of its ends, to the knob, for the adjustment of the tensioning of the tie rod, the knob having a female thread and the second end of the tie rod being threaded to engage the female thread by screwing, so that rotation of the knob varies the tensioning of the tie rod and consequently the clamping of the collet onto the head, and (c) a guide bush driven into the second end of the stem, the tie rod being guided in the guide bush in a non-rotatable manner; and axial preloading means provided on the tie rod, so that the tie rod is tensioned, even when the knob is fully slackened, ensuring a minimal clamping of the collet onto the spherical element, the preloading means comprising a spring interposed between the tie rod and the guide bush.

* * * * *

UNITED STATES PATENT AND TRADEMARK OFFICE
CERTIFICATE OF CORRECTION

PATENT NO. : 7,229,053 B2
APPLICATION NO. : 10/523161
DATED : June 12, 2007
INVENTOR(S) : Speggiorin It is certified that error appears in the above-identified patent and that said Letters Patent is hereby corrected as shown below:

On the cover page, under item (54), the Title of the Invention should read:

A TRIPOD FOR SUPPORTING APPARATUS SUCH AS OPTICAL OR PHOTOGRAPHIC APPARATUS

Col 5, Line 14, SHOULD READ:

10. The tripod according to claim 9 in which the head

Col 5, Line 36, SHOULD READ:

section, a respective appendage projecting radially from an

Signed and Sealed this

Thirteenth Day of November, 2007

JON W. DUDAS
*Director of the United States Patent and Trademark Office*